(12) United States Patent
Lai

(10) Patent No.: US 9,847,726 B2
(45) Date of Patent: Dec. 19, 2017

(54) CONVERTER CONTROL SYSTEM

(71) Applicant: JOINT POWER EXPONENT, LTD., Hsinchu (TW)

(72) Inventor: Jyh-Ting Lai, Hsinchu (TW)

(73) Assignee: Joint Power Exponent, Ltd., Hsinchu (TW)

( * ) Notice: Subject to any disclaimer, the term of this patent is extended or adjusted under 35 U.S.C. 154(b) by 0 days.

(21) Appl. No.: 15/267,630

(22) Filed: Sep. 16, 2016

(65) Prior Publication Data

US 2017/0085184 A1 Mar. 23, 2017

(30) Foreign Application Priority Data

Sep. 18, 2015 (TW) .............................. 104130941 A

(51) Int. Cl.
*H02M 3/335* (2006.01)
*H02M 1/00* (2006.01)

(52) U.S. Cl.
CPC .................. *H02M 3/33507* (2013.01); *H02M 2001/0032* (2013.01); *Y02B 70/16* (2013.01)

(58) Field of Classification Search
CPC ..... H02M 3/33507; H02M 2001/0032; H02M 3/157
USPC .............................. 363/21.01–21.18; 323/283
See application file for complete search history.

(56) References Cited

U.S. PATENT DOCUMENTS

| 4,849,869 A * | 7/1989 | Tanuma | H02M 3/33523 363/21.13 |
| 7,057,907 B2 * | 6/2006 | Oh | H02M 3/33515 363/21.01 |
| 7,378,805 B2 * | 5/2008 | Oh | H05B 33/0815 315/219 |

(Continued)

FOREIGN PATENT DOCUMENTS

| CN | 101882875 | 2/2013 |
| TW | I431883 | 3/2014 |

(Continued)

OTHER PUBLICATIONS

Received STIC search report from EIC 2800 searcher John DiGeronimo on May 9, 2017.*

*Primary Examiner* — Timothy J Dole
*Assistant Examiner* — Htet Z Kyaw
(74) *Attorney, Agent, or Firm* — Muncy, Geissler, Olds & Lowe, P.C.

(57) ABSTRACT

A converter control system includes an analog-to-digital converter, a filter and a control module. The analog-to-digital converter digitalizes a different-time and a real-time feedback voltage. The filter bases on the different-time feedback voltage to sample a historical average feedback voltage. The control module receives the real-time feedback voltage, bases on the historical average feedback voltage to detect a load status of the converter, and bases on the real-time feedback voltage and the historical average feedback voltage to derive a voltage difference. The control module applies a control duty cycle to control the load (Continued)

switch. While the control module detects that the load status switches to a heavy-load status and the voltage difference reaches the threshold voltage, the control duty cycle is increased. While the control module detects that the load status switches to the light-load status and the voltage difference reaches the threshold voltage, the control duty cycle is decreased.

5 Claims, 5 Drawing Sheets

(56) References Cited

U.S. PATENT DOCUMENTS

| | | | | |
|---|---|---|---|---|
| 7,554,310 B2 * | 6/2009 | Chapuis | ............... | H02M 3/157 323/282 |
| 7,755,342 B2 * | 7/2010 | Chen | ............... | H02M 3/156 323/271 |
| 7,893,674 B2 * | 2/2011 | Mok | ............... | H02M 3/157 323/283 |
| 8,130,522 B2 * | 3/2012 | Maksimovic | ....... | H02M 3/1584 323/222 |
| 8,148,906 B2 * | 4/2012 | Yamamuro | ....... | H02M 3/33507 315/219 |
| 8,659,276 B2 * | 2/2014 | Skinner | ............... | H02M 3/1584 323/272 |
| 8,976,543 B1 * | 3/2015 | Zheng | ............... | H02M 1/38 363/17 |
| 9,024,613 B2 * | 5/2015 | Murata | ............. | H02M 3/33507 323/285 |
| 9,231,484 B2 * | 1/2016 | Uno | ............... | H02M 3/33569 |
| 9,570,999 B2 * | 2/2017 | Yang | ............... | H02M 3/33576 |
| 2007/0182391 A1 * | 8/2007 | Chapuis | ............... | H02M 3/157 323/282 |
| 2007/0210772 A1 * | 9/2007 | Sawtell | ............... | H02M 3/156 323/282 |
| 2008/0084713 A1 * | 4/2008 | Baurle | ............... | H02M 3/33515 363/21.01 |
| 2008/0278123 A1 * | 11/2008 | Mehas | ............... | H02M 3/1588 323/266 |
| 2009/0237053 A1 * | 9/2009 | Gan | ............... | H02M 3/156 323/283 |
| 2012/0187928 A1 * | 7/2012 | Parto | ............... | H02M 3/1588 323/271 |
| 2012/0250366 A1 * | 10/2012 | Wang | ............... | H02M 3/33523 363/21.15 |
| 2013/0151919 A1 * | 6/2013 | Huynh | ............... | G06F 1/26 714/746 |
| 2014/0119066 A1 * | 5/2014 | Lin | ............... | H02M 3/33523 363/21.15 |
| 2014/0125302 A1 * | 5/2014 | Yang | ............... | H02M 3/1563 323/282 |
| 2015/0249391 A1 * | 9/2015 | Yang | ............... | H02M 3/33576 363/21.01 |

FOREIGN PATENT DOCUMENTS

| | | |
|---|---|---|
| TW | I437809 | 5/2014 |
| TW | I443946 | 7/2014 |
| TW | I460571 | 11/2014 |
| TW | I496401 | 8/2015 |
| TW | I496405 | 8/2015 |

* cited by examiner

CONVERTER CONTROL SYSTEM

This application claims the benefit of Taiwan Patent Application Serial No. 104130941, filed Sep. 18, 2015, the subject matter of which is incorporated herein by reference.

BACKGROUND OF INVENTION

1. Field of the Invention

The invention relates to a converter control system, and more particularly to the converter control system that introduces digital circuits to control and adjust duty cycles according to the light-load status and the heavy-load status.

2. Description of the Prior Art

With progress in modern technology, various electronic devices have become necessities to people's daily life. Also, as rising demands in energy saving and environment preservation upon consumer electronics, low power consumption for an idle state of the electronic product so as to extend service life of batteries and to reduce the consumption of electricity has been one of basic requirements for designing a converter in this industry.

Referring to FIG. 1, a schematic view of a conventional power converter (a flyback converter) is shown. Generally, this flyback converter includes an analog pulse width modulation (PWM) control switch module PA1 and a converter PA2. The converter PA2 electrically coupled with the analog PWM control switch module PA1 generally includes a bridge rectifier PA21, a transformer PA22, a filter circuit PA23, a load switch PA24, a feedback circuit PA25, a compensation circuit PA26 and a load resistor PA27. The transformer PA22 is electrically coupled with the bridge rectifier PA21 and the filter circuit PA23. The load switch PA24 is electrically coupled with the transformer PA22 and the load resistor PA27. The feedback circuit PA25 is electrically coupled with the filter circuit PA23 and the compensation circuit PA26. In addition, the compensation circuit PA26 is electrically coupled with the analog PWM control switch module PA1.

In this conventional design, the analog PWM control switch module PA1 bases on the load status to control the load switch PA24 to be switched on or off. The analog PWM control switch module PA1 electrically coupled with the converter PA2 can be mainly consisted of a leading edge blanking (LEB) circuit, an oscillator, an error amplifier, a latch circuit and a comparator. However, in general, this type of the analog circuit usually lacks of design flexibility. In practice, in the case that the converter PA2 is operated in a continuous conduction mode (CCM), a discontinuous conduction mode (DCM) or a boundary conduction mode (BCM) so that a revised circuit is needed, the revision work would be confined to the framework of the analog circuit, and thus the re-programming would be hard to performed. Hence, a new design for the internal circuit and the compensation circuit PA26 would be necessary, from which direct applicability would be poor.

SUMMARY OF THE INVENTION

In view that the conventional technique is to use the analog circuit to control the load switch, thus, under the framework of the analog circuit, revising the circuit, which is time-consuming, is necessary to meet a change in operation mode. Accordingly, it is the primary object of the present invention to provide a converter control system that can adopt a digital means to design the circuit so as to effectively resolve the shortcomings as described above.

In the present invention, the converter control system is electrically coupled with a converter. The converter includes an input level circuit, a load switch and an output level circuit. The load switch is electrically coupled with the input level circuit, and the output level circuit is electrically coupled with the input level circuit. The converter control system includes an analog-to-digital converter (ADC), a filter and a control module. The analog-to-digital converter (ADC) electrically coupled with an output terminal of the output level circuit is to convert a different-time feedback voltage outputted at the output terminal in a different time from an analog-signal form to a digital-signal form, and also to convert a real-time feedback voltage outputted at the output terminal in a real time from an analog-signal form to a digital-signal form. The filter electrically coupled with the analog-to-digital converter is to base on the different-time feedback voltage in the digital-signal form to sample a historical average feedback voltage. The control module electrically coupled with the analog-to-digital converter, the filter and the load switch has a threshold voltage, is to receive the real-time feedback voltage in the digital form outputted from the output terminal is to base on the historical average feedback voltage to detect a load status of the converter, and further to base on the real-time feedback voltage and the historical average feedback voltage to derive a voltage difference. In the present invention, the control module applies a control duty cycle to control the load switch. While the control module detects that the load status is switched from a light-load status to a heavy-load status and the voltage difference reaches the threshold voltage, the control duty cycle is increased for controlling the load switch. While the control module detects that the load status is switched from the heavy-load status to the light-load status and the voltage difference reaches the threshold voltage, the control duty cycle is decreased for controlling the load switch.

In one embodiment of the present invention, the analog-to-digital converter of the converter control system, electrically coupled with the output terminal, the filter the control module, is to convert a different-time feedback voltage outputted at the output terminal in a different time from an analog-signal form to a digital-signal form, and also to convert a real-time feedback voltage outputted at the output terminal in a real time from an analog-signal form to a digital-signal form. In addition, the converter control system further includes a driver module electrically coupled with the control module and the load switch so as to base on the control module to control and drive the load switch. Also, the converter is a flyback converter.

In one embodiment of the present invention, the converter control system further includes a programmable process module. The programmable process module includes a switching-on time lookup unit and a switching-off time lookup unit. The switching-on time lookup unit electrically coupled with the analog-to-digital converter and the control module has a first relationship table of the real-time feedback voltage with respect to an initial time, and is to base on the real-time feedback voltage in the digital-signal form to obtain the corresponding switching-on time and so as to transmit a first lookup signal representing the switching-on time to the control module. The switching-off time lookup unit electrically coupled with the filter and the control module has a second relationship table of the historical average feedback voltage with respect to a switching-off time, and is to base on the historical average feedback voltage to obtain the corresponding switching-off time and so as to transmit a second lookup signal representing the switching-off time to the control module. In addition, the control module bases on the first lookup signal and the second lookup signal to adjust the control duty cycle.

In one embodiment of the present invention, the converter control system includes a programmable process module. The programmable process module includes a multiplicator, a first multiplexer and a second multiplexer. The multiplicator electrically coupled with the analog-to-digital converter has a preset multiplication value, and is to perform calculation upon the real-time feedback voltage in the digital-signal form and the preset multiplication value so as to produce a calculated multiplication value. The first multiplexer is to base on the load status to selectively receive one of a light-to-heavy load switching-on time and a heavy-to-light load switching-on time. The second multiplexer electrically coupled with the multiplicator, the first multiplexer and the control module is triggered to receive the light-to-heavy load switching-on time transmitted from the first multiplexer upon when the load status is switched from the light-load status to the heavy-load status and further to transmit the light-to-heavy load switching-on time to the control module. In addition, the second multiplexer is triggered to receive the heavy-to-light load switching-on time transmitted from the first multiplexer upon when the load status is switched from the heavy-load status to the light-load status and further to transmit the heavy-to-light load switching-on time to the control module. Further, in order to maintain the original load status, the second multiplexer maintains to output the calculated multiplication value.

In one embodiment of the present invention, the programmable process module includes a switching-off time lookup unit, a third multiplexer and a fourth multiplexer. The switching-off time lookup unit electrically coupled with the filter has a relation-mapping table of the historical average feedback voltage with respect to a switching-off time, and is to base on the historical average feedback voltage to obtain and transmit the corresponding switching-off time. The third multiplexer is to base on the load status to selectively receive one of a light-to-heavy load switching-off time and a heavy-to-light load switching-off time. The fourth multiplexer electrically coupled with the switching-off time lookup unit, the third multiplexer and the control module is triggered to receive the light-to-heavy load switching-off time transmitted from the third multiplexer upon when the load status is switched from the light-load status to the heavy-load status and further to transmit the light-to-heavy load switching-off time to the control module, and is triggered to receive the heavy-to-light load switching-off time transmitted from the third multiplexer upon when the load status is switched from the heavy-load status to the light-load status and further to transmit the heavy-to-light load switching-off time to the control module. In addition, in order to maintain the original load status, the fourth multiplexer maintains to output the switching-off time.

By providing the converter control system of the present invention to re-program according to different operation modes, the time-consuming redesign of the circuits would be thus avoided. In addition, upon judging the difference between the average value and the real-time feedback value, the duty cycle can be adjusted in time according to the heavy load or the light load, such that phenomena of overshoot and load drop in the converter can be effectively avoided.

All these objects are achieved by the converter control system described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a converter control system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
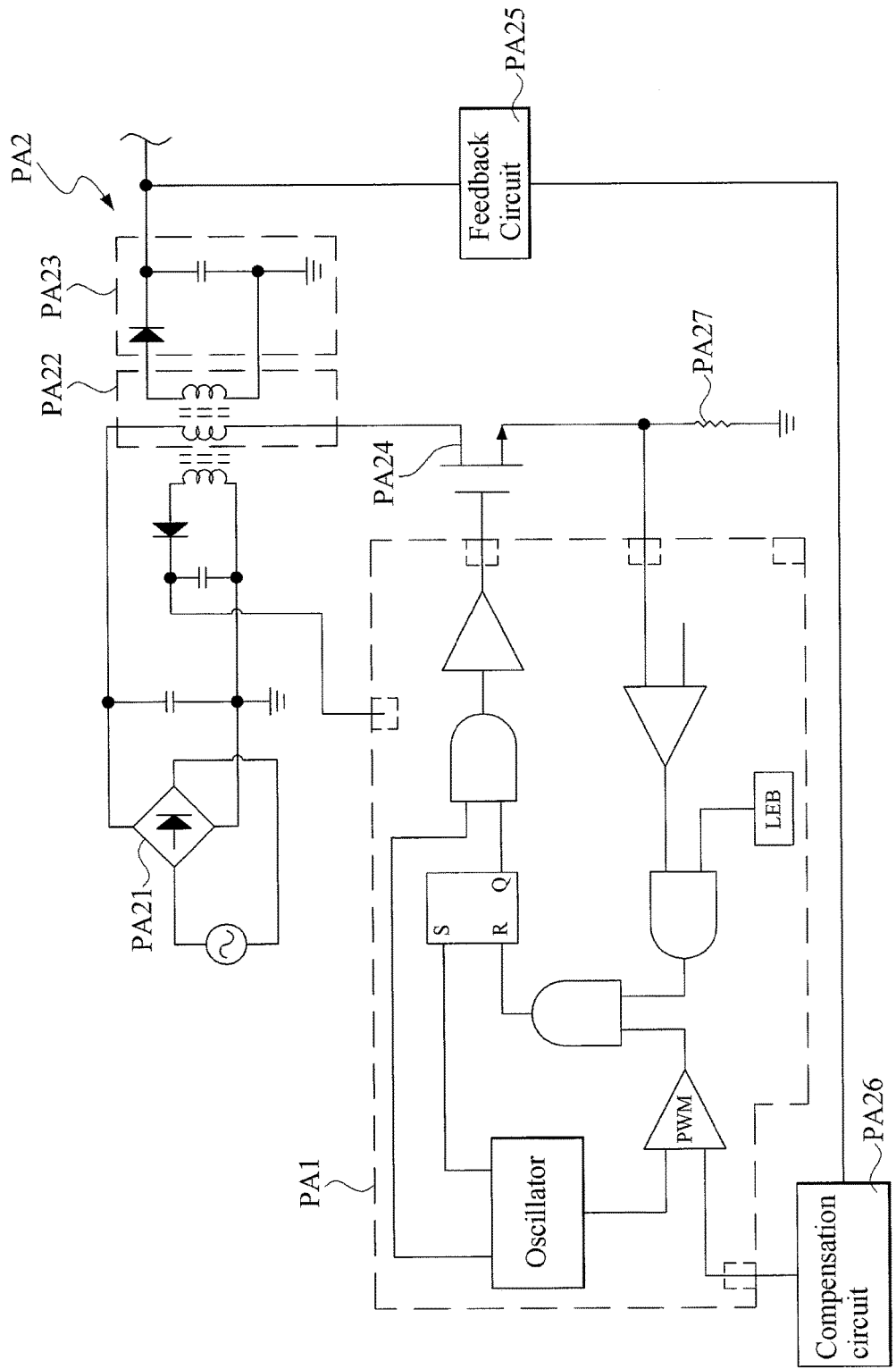
FIG. 1 is a schematic view of a conventional power converter.
Figure 2:
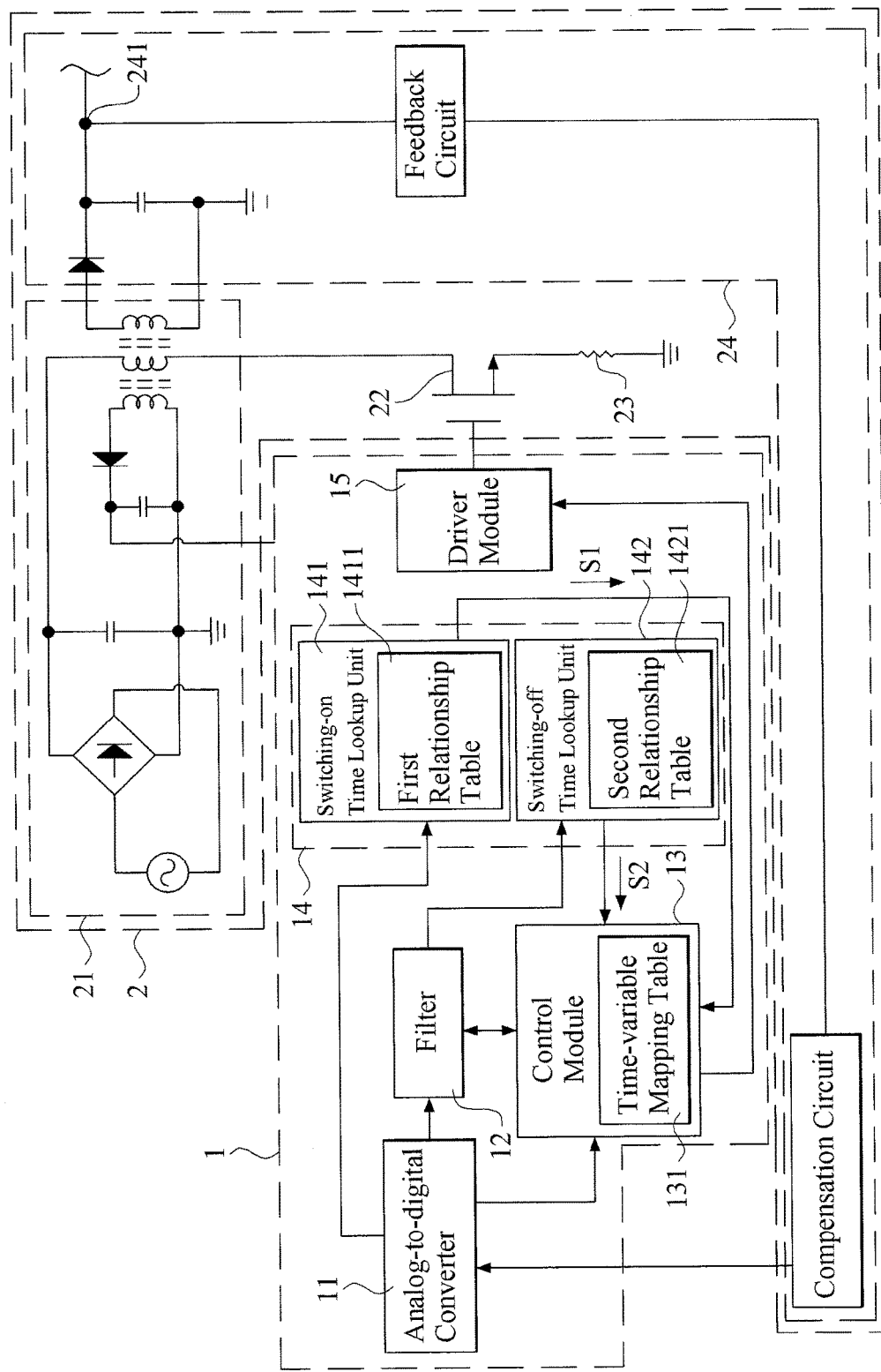
FIG. 2 is a schematic view of a preferred embodiment of the converter control system in accordance with the present invention, connected with a converter.

Referring now to FIG. 2, a schematic view of a preferred embodiment of the converter control system in accordance with the present invention, which is connected with a converter, is shown.

As shown, the preferred converter control system 1 is electrically coupled with a converter 2. The converter 2 can be, but not limited to, a flyback converter. The converter 2 includes an input level circuit 21, a load switch 22, a load resistor 23 and an output level circuit 24. The input level circuit 21 generally includes an alternate current (AC) source. The bridge rectifier, the bulk capacitor, the inductor, the diode, the capacitor and the transformer are already well known in the art, and thus details thereabout would be omitted herein. The load switch 22 is electrically coupled with the transformer of the input level circuit 21, the load resistor 23 is electrically coupled with the load switch 22, and the output level circuit 24 is electrically coupled with the input level circuit 21. In practice, the converter control system of the present invention may also include filter circuits, feedback circuits, compensation circuits and the like. However, all these elements are already well known in the art, and thus details thereabout would be omitted herein.

The converter control system 1 includes an analog-to-digital converter (ADC) 11, a filter 12, a control module 13, a programmable process module 14 and a driver module 15. The analog-to-digital converter 11 is electrically coupled with an output terminal 241 of the output level circuit 24. It shall be noted that the term "electrically coupled with" in this description stands for being electrically coupled in either a direct or an indirect coupling means. In particular, the analog-to-digital converter 11 is indirectly electrically coupled with the output terminal 241 via the compensation circuit and the feedback circuit. The filter 12 electrically coupled with the analog-to-digital converter 11 can be a root-mean-square (RMS) low-pass filter (in this embodiment) or a circuit capable of sampling average values (in other embodiments).

The control module 13 is electrically coupled with the analog-to-digital converter 11, the filter 12 and the load switch 22. The control module 13 can be a microcontroller or other functional circuit with equivalent processing ability. The control module 13 electrically indirectly coupled with the load switch 22 has a threshold voltage, positive or negative per the related circuits, preferably positive. In the preferred embodiment of the present invention, the threshold voltage is set to be 120V. However, in other embodiments, the threshold voltage can be 80V, 90V, 100V, 120V, 140V or any the like.

The programmable process module 14 can be a programmable gain controller, and further includes a switching-on time lookup unit 141 and a switching-off time table-checking unit 142. The switching-on time lookup unit 141 electrically coupled with the analog-to-digital converter 11 and the control module 13 has a first relationship table 1411 for presenting the relationship between the real-time feedback voltage and the switching-on time. Table 1 as follows is a typical table thereabout. In Table 1, the real-time feedback voltage is demonstrated in, but not limited to, an 8-bit digital form. As listed, the switching-on time increases as the real-time feedback voltage increases.

TABLE 1

| Real-time feedback voltage | Switching-on time (ns) |
|---|---|
| 11000110 | 10 |
| 11001001 | 12 |
| 11100010 | 14 |

The switching-off time lookup unit 142 electrically coupled with the filter 12 and the control module 13 has a second relationship table 1421. The second relationship table 1421 presents the relationship between the historical average feedback voltage and the switching-off time, in which the historical average feedback voltage is presented in, but not limited to, an 8-bit digital form. However, the switching-off time decreases as the historical average feedback voltage increases.

TABLE 2

| Historical average feedback voltage | Switching-off time (ns) |
|---|---|
| 00000110 | 8 |
| 00011000 | 6 |
| 00100101 | 4 |

It shall be noted that the control module 13 may include a time-variable mapping table 131. The time-variable mapping table 131 may present, but not limited to, relationships of the real-time feedback voltage, the historical average feedback voltage, or a voltage difference with respect to the switching-on time, the switching-off time or a time variable. The time variable can be a multiplication value or a constant. In the case that the time variable is a constant, then 95% would be the upper bound, while 5% is the lower bound.

The driver module 15 electrically coupled with the control module 13 and the load switch 22 can include a switching-point prediction circuit and a switch-driving circuit. The switching-point prediction circuit and the switch-driving circuit are well known in the art, and thus details thereabout would be omitted herein.

Figure 3:
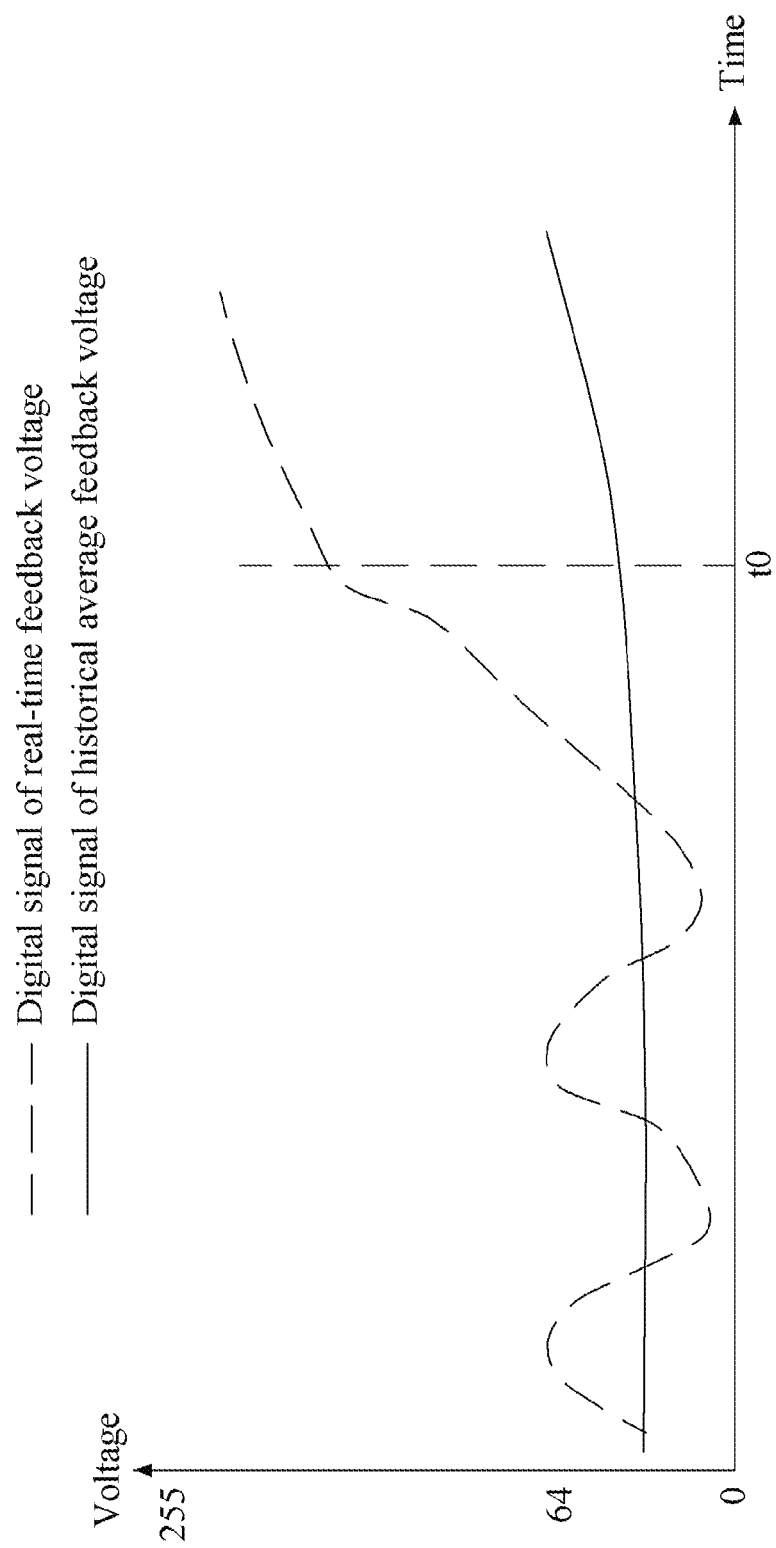
FIG. 3 is a schematic waveform plot of the converter control system of FIG. 2, switched from the light-load status to the heavy-load status.
Figure 4:
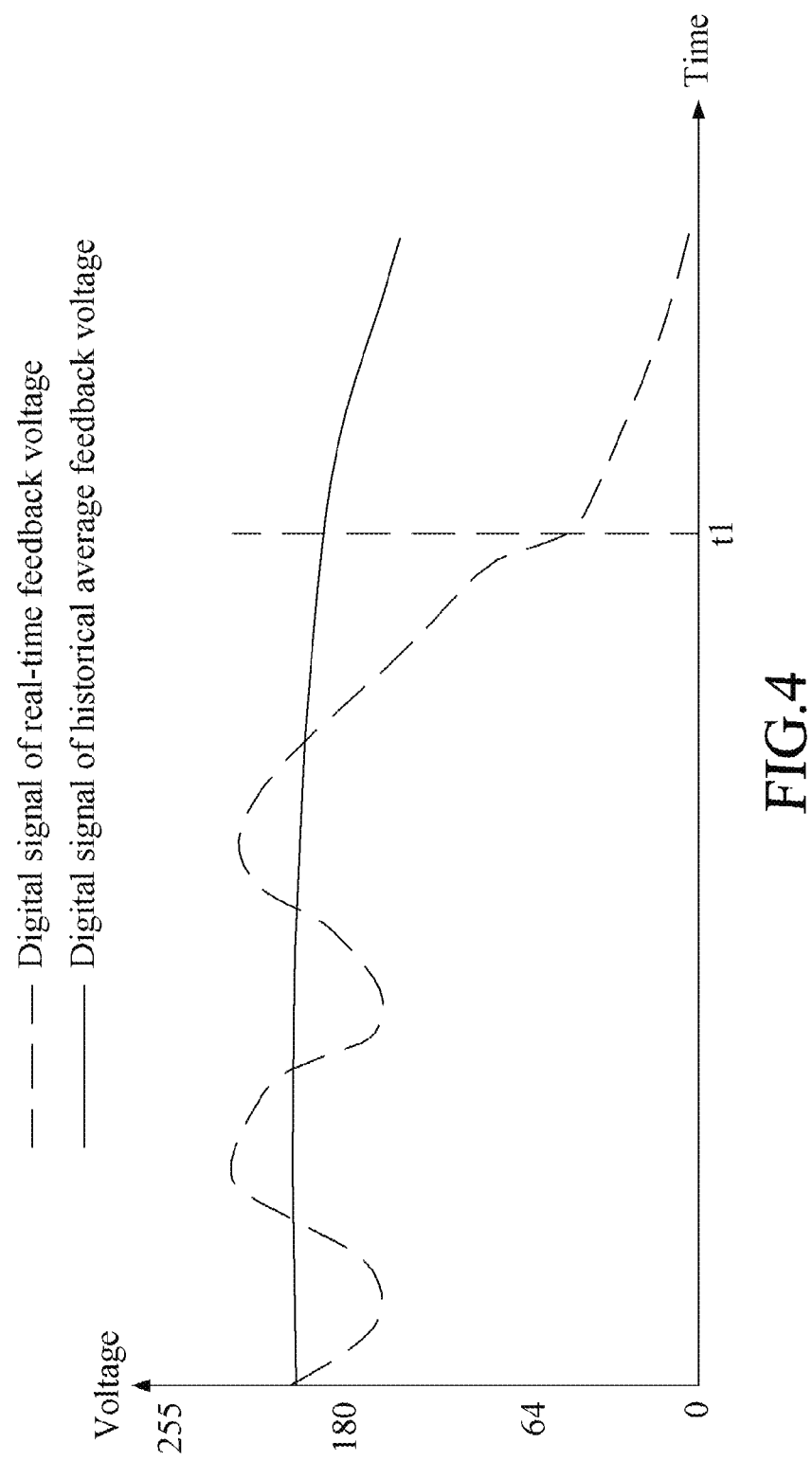
FIG. 4 is a schematic waveform plot of the converter control system of FIG. 2, switched from the heavy-load status to the light-load status.

Refer to FIG. 2 through FIG. 4; where FIG. 3 is a schematic waveform plot of the converter control system of FIG. 2 switched from the light-load status to the heavy-load status, and FIG. 4 is a schematic waveform plot of the converter control system of FIG. 2 switched from the heavy-load status to the light-load status. As shown, after the input level circuit 21 of the converter 2 provides the alternate current, a corresponding analog output voltage would be generated at the output terminal 241 of the output level circuit 24, and the output voltage would be further feedback to the converter control system 1. The analog-to-digital converter 11 would then convert the analog output voltage into a corresponding digital signal. In the present invention, since the output terminal 241 would output different output voltages at different times (for example, at the $1^{st}$ second, the $2^{nd}$ second, the $3^{rd}$ second, and so on). The analog-to-digital converter 11 would convert the real-time feedback voltage outputted by the output terminal 241 at the instant time from an analog signal to a corresponding digital signal. For example, if the instant time is the $4^{th}$ second, then the real-time output voltage at the $4^{th}$ second is defined as the real-time feedback voltage. On the other hand, the analog-to-digital converter 11 would also convert the different-time feedback voltage outputted by the output terminal 241 at different timing from an analog signal to a corresponding digital signal. For example, if the current time is the $4^{th}$ second, then the output voltage at the $1^{st}$ second, the $2^{nd}$ second or the $3^{rd}$ second would be defined as the different-time feedback voltage.

The filter 12 bases on the different-time feedback voltages in the form of digital signals to produce a historical average feedback voltage. The calculation of the historical average feedback voltage can be performed, but not limited, by averaging three consecutive different-time feedback voltages. In addition, upon receiving the historical average feedback voltage, the control module 13 would base on the historical average feedback voltage to detect a load status of the converter 2. In the present invention, the load status is directed to the light-load status and the heavy-load status. Regarding the detection means, firstly the control module 13 can include a preset light-load value (62V for example) and a preset heavy-load value (182V for example). Then, if the historical average feedback voltage is smaller than or equal to the preset light-load value, then the load status is judged to be the light load. On the other hand, if the historical average feedback voltage is larger than or equal to the preset heavy-load value, then the load status would be judged to be the heavy load. The control module 13 would receive the real-time feedback voltages outputted by the output terminal 241 in the form of digital signals, and would base on the real-time feedback voltages and the historical average feedback voltages to derive a voltage difference, preferably an absolute value of the voltage difference.

In the present invention, the control module 13 applies a control duty cycle to control the load switch 22 to be switched on or off. As shown in FIG. 3, as the control module 13 detects that the load status is switched from the light-load status to the heavy-load status at time t0 and that the voltage difference reaches the threshold voltage, then a fast transient mode (FTM) is entered to increase the control duty cycle so as further to control the load switch 22. For example, if the control duty cycle is originally at 40%, then, at this moment, the control duty cycle might be increased to 80%. In addition, as shown in FIG. 4, as the control module 13 detects that the load status is switched from the heavy-load status to the light-load status at time t1 and that the voltage difference reaches the threshold voltage, then another fast transient mode (FTM) is entered to decrease the control duty cycle so as further to control the load switch 22. For example, if the control duty cycle is originally at 40%, then, at this moment, the control duty cycle might be decreased to 20%.

The aforesaid adjustment of the control duty cycle can be achieved by manipulating the switching-on time lookup unit 141 and the switching-off time lookup unit 142. Practically, the switching-on time lookup unit 141 would base on the real-time feedback voltage in the digital-signal form to obtain the corresponding current switching-on time from the first relationship table 1411, so as to transmit a first lookup signal S1 representing the switching-on time to the control module 13. In addition, the switching-off time lookup unit 142 would base on the historical average feedback voltage to obtain the corresponding current switching-off time from the second relationship table 1421, so as to transmit a second lookup signal S2 representing the switching-off time to the control module 13. The control module 13 would base on the first lookup signal S1 and the second lookup signal S2 to control the counting of the counter, so as further to adjust the control duty cycle by increasing or decreasing. The driver module 15 is also triggered to base on the action of the control module 13 upon the load switch 22 (i.e. the adjustment in the control duty cycle) to drive the load switch 22 to be switched on or off.

For example, in the control method from the light-load status to the heavy-load status, the first table-checking signal S1 can be 10 ns, and the second lookup signal S2 can be 8 ns. Then, the control module 13 bases on the real-time feedback voltage and the historical average feedback voltage to determine the actions of the control module 13 upon when the load status is switched from the light-load status to the heavy-load status. The actions of the control module 13 are to base on the time-variable mapping table 131 (for example, to obtain the time variable corresponding to the voltage difference, the switching-on time and the switching-off time in the heavy-load status) to perform an operation between the original switching-on time and a time variable (for example, to have the original switching-on time to multiply the time variable) and an operation between the original switching-off time and another time variable (for example, to have the original switching-off time to multiply another time variable), so as to quickly increase the control duty cycle. In other embodiments, the original switching-on time can be directly adjusted to 95%, the maximum value; and, the switching-off time can be adjusted to 5%, the minimum value. The adjustment is mainly dependent on the voltage difference. The scale of the adjustment would be increased if the voltage difference is larger. Similarly, in the control method from the heavy-load status to the light-load status, the first table-checking signal S1 can be 20 ns, and the second lookup signal S2 can be 5 ns. Then, the control module 13 bases on the real-time feedback voltage and the historical average feedback voltage to determine the actions of the control module 13 upon when the load status is switched from the heavy-load status to the light-load status. The actions of the control module 13 are to base on the time-variable mapping table 131 (for example, to obtain the time variable corresponding to the voltage difference, the switching-on time and the switching-off time in the light-load status) to perform an operation between the original switching-on time and a time variable (for example, to have the original switching-on time to multiply the time variable) and an operation between the original switching-off time and another time variable (for example, to have the original switching-off time to multiply another time variable), so as to quickly decrease the control duty cycle. In other embodiments, the original switching-on time can be directly adjusted to 5%, the minimum value; and, the switching-off time can be adjusted to 95%, the maximum value. The adjustment is mainly dependent on the voltage difference. The scale of the adjustment would be increased if the voltage difference is larger. Anyway, the forgoing adjustment is raised for example only, not to limit the application of the present invention.

Figure 5:
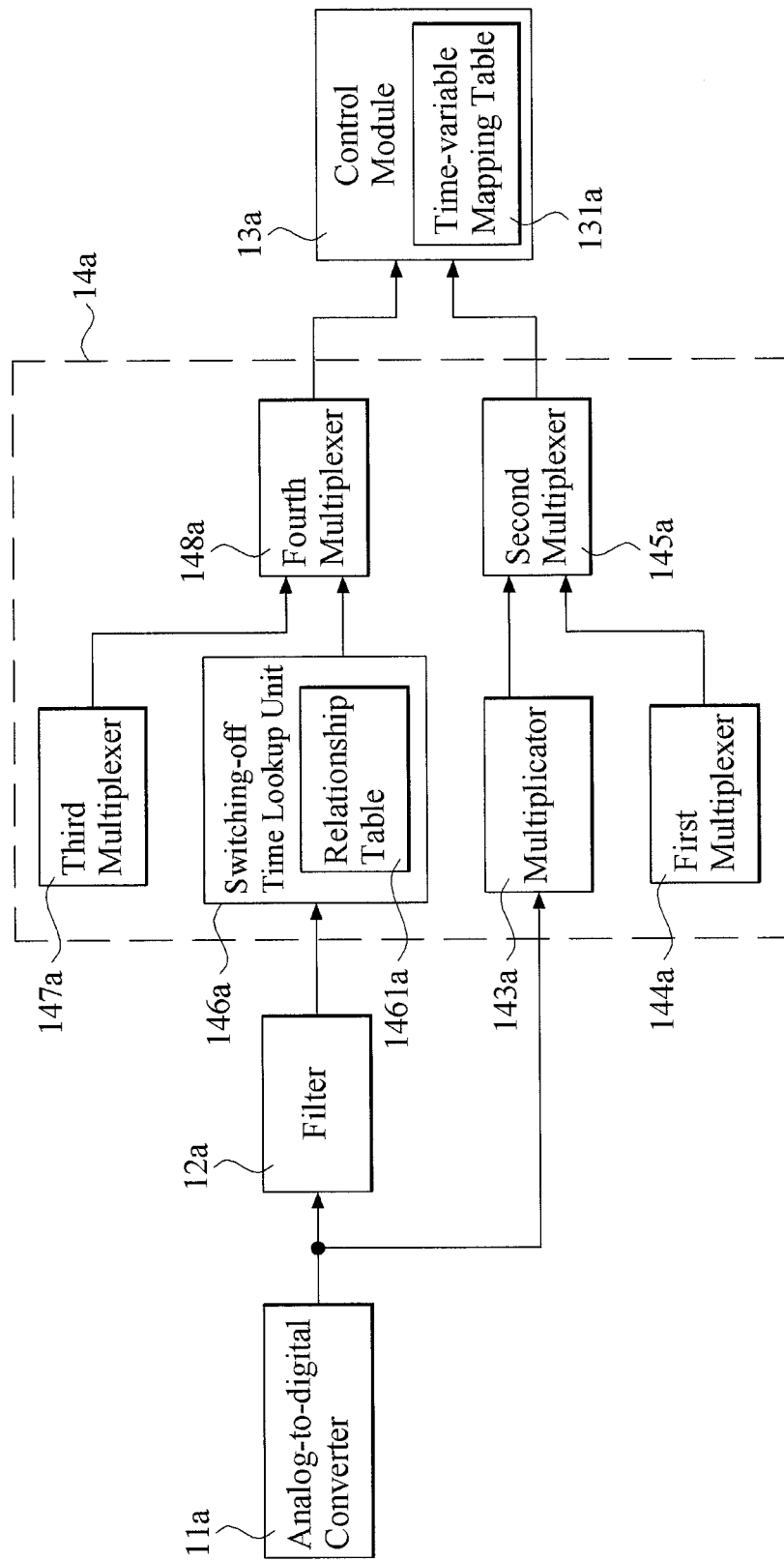
FIG. 5 is a schematic block view of a programmable process module of another embodiment of the converter control system in accordance with the present invention.

Referring now to FIG. 5, a schematic block view of a programmable process module of another embodiment of the converter control system in accordance with the present invention is shown. The major difference between this embodiment of FIG. 5 and the foregoing example of FIG. 2 is that, in this embodiment, the programmable process module 14a includes a multiplicator 143a, a first multiplexer 144a, a second multiplexer 145a, a switching-off time lookup unit 146a, a third multiplexer 147a and a fourth multiplexer 148a. The multiplicator 143a electrically coupled with the analog-to-digital converter 11a includes a preset multiplication value ranging from 0.1 to 2, for example. The second multiplexer 145a is electrically coupled with the multiplicator 143a, the first multiplexer 144a and the control module 13a. The switching-off time lookup unit 146a electrically coupled with the filter 12a includes a historical average feedback voltage and a relation-mapping table 1461a of the switching-off time, both of which are the same as those in the aforesaid embodiment. The fourth multiplexer 148a is electrically coupled with the switching-off time lookup unit 146a, the third multiplexer 147a and the control module 13a.

The multiplicator 143a is to perform calculation between the real-time feedback voltage in the digital-signal form and the preset multiplication value, so as to produce a calculated multiplication value. Practically, the real-time feedback voltage can multiply the preset multiplication value to obtain the aforesaid calculated multiplication value. The first multiplexer 144a bases on the load status to selectively receive one of a light-to-heavy load switching-on time and a heavy-to-light load switching-on time. It shall be noted that the preset multiplication value, the light-to-heavy load switching-on time and the heavy-to-light load switching-on time can be varied according to practical requirements.

The switching-off time lookup unit 146a is to base on the historical average feedback voltage to obtain and further transmit a corresponding switching-off time. The third multiplexer 147a is to base on the load status to selectively receive one of a light-to-heavy load switching-off time and a heavy-to-light load switching-off time. Similarly, the light-to-heavy load switching-off time and the heavy-to-light load switching-off time can be varied according to practical requirements.

In the present invention, in order not to alter the original load status (i.e. not to switch from the light-load status to the heavy-load status, or not to switch from the heavy-load status to the light-load status), the second multiplexer 145a maintains the output of the calculated multiplication value, and the fourth multiplexer 148a maintains the output of the switching-off time. Namely, under the circumstance that the load status does not change, both the second multiplexer 145a and the fourth multiplexer 148a maintain to output the calculation result of the multiplicator 143a and the result from checking the switching-off time lookup unit 146a, respectively.

In the case that the load status is switched from the light-load status to the heavy-load status, the second multiplexer 145a is triggered to receive the light-to-heavy load switching-on time transmitted from the first multiplexer 144a. More precisely, at this time, the first multiplexer 144a selectively receives and further transmit the light-to-heavy load switching-on time. Also, the light-to-heavy load switching-on time is transmitted to the control module 13a. Simultaneously, the fourth multiplexer 148a is triggered to receive the light-to-heavy load switching-off time transmitted from the third multiplexer 147a, and the light-to-heavy load switching-off time is further transmitted to the control module 13a, such that the control module 13a can base on the light-to-heavy load switching-on time and the light-to-heavy load switching-off time to adjust the control duty cycle.

In addition, in the case that the load status is switched from the heavy-load status to the light-load status, the second multiplexer 145a is triggered to receive the heavy-to-light load switching-on time transmitted from the first multiplexer 144a, and the heavy-to-light load switching-on time is further transmitted to the control module 13a. The fourth multiplexer 148a is triggered to receive the heavy-to-light load switching-off time transmitted from the third multiplexer 147a, and the heavy-to-light load switching-off time is further transmitted to the control module 13a, such that the control module 13a can base on the heavy-to-light load switching-on time and the heavy-to-light load switching-off time to adjust the control duty cycle.

Similarly, the control module 13a can have a time-variable mapping table 131a. The time-variable mapping table 131a can, but not limit to, demonstrate the relationships among the real-time feedback voltage, the historical average feedback voltage, the voltage difference, the light-to-heavy load switching-on time, the light-to-heavy load switching-off time, the heavy-to-light load switching-on time, the heavy-to-light load switching-off time and the time variable. The time variable can be a multiplication value or a constant. If the time variable is a constant, the maximum would be 95%, while the minimum would be 5%. The control module 13a can apply the time-variable mapping table 131a, the light-to-heavy load switching-on time and the light-to-heavy load switching-off time, or the heavy-to-light load switching-on time and the heavy-to-light load switching-off time to calculate a relevant result so as to quickly increase or decrease the control duty cycle. The calculation for this embodiment is the same as that for the previous embodiment, and thus details thereabout would be omitted herein.

In summary, by providing the converter control system of the present invention to re-program according to different operation modes, thus the time-consuming redesign of the circuits would be avoided. In addition, upon judging the difference between the average value and the real-time feedback value, the duty cycle can be adjusted in time according to the heavy load or the light load, such that phenomena of overshoot and load drop in the converter can be effectively avoided.

While the present invention has been particularly shown and described with reference to a preferred embodiment, it will be understood by those skilled in the art that various changes in form and detail may be without departing from the spirit and scope of the present invention.

What is claimed is:

1. A converter control system, electrically coupled with a converter, the converter including an input level circuit, a load switch and an output level circuit, the load switch being electrically coupled with the input level circuit, the output level circuit being electrically coupled with the input level circuit, the converter control system comprising:

an analog-to-digital converter (ADC), electrically coupled with an output terminal of the output level circuit, being to convert a different-time feedback voltage outputted at the output terminal in a different time from an analog-signal form to a digital-signal form, also being to convert a real-time feedback voltage outputted at the output terminal in a real time from an analog-signal form to a digital-signal form;

a filter, electrically coupled with the analog-to-digital converter, being to base on the different-time feedback voltage in the digital-signal form to sample a historical average feedback voltage; and a control module, electrically coupled with the analog-to-digital converter, the filter and the load switch, having a threshold voltage, being to receive the real-time feedback voltage in the digital form outputted from the output terminal, also being to base on the historical average feedback voltage to detect a load status of the converter, further being to base on the real-time feedback voltage and the historical average feedback voltage to derive a voltage difference; and a programmable process module, including:

a switching-on time lookup unit, electrically coupled with the analog-to-digital converter and the control module, having a first relationship table of the real-time feedback voltage with respect to a switching-on time, being to base on the real-time feedback voltage in the digital-signal form to obtain the corresponding switching-on time and so as to transmit a first lookup signal representing the initial time to the control module; and a switching-off time lookup unit, electrically coupled with the filter and the control module, having a second relationship table of the historical average feedback voltage with respect to a switching-off time, being to base on the historical average feedback voltage to obtain the corresponding switching-off time and so as to transmit a second lookup signal representing the switching-off time to the control module;

wherein the control module applies a control duty cycle to control the load switch;

wherein, while the control module detects that the load status is switched from a light-load status to a heavy-load status and the voltage difference reaches the threshold voltage, the control duty cycle is increased for controlling the load switch;

wherein, while the control module detects that the load status is switched from the heavy-load status to the light-load status and the voltage difference reaches the threshold voltage, the control duty cycle is decreased for controlling the load switch; and wherein the control module further includes a time-variable mapping table for demonstrating relationships among the real-time feedback voltage, the different-time feedback voltage, the voltage difference, the switching-on time, the switching-off time and a time variable, so as to base on the time-variable mapping table to control and adjust the control duty cycle upon when the first lookup signal and the second lookup signal are received.

2. The converter control system of claim 1, further including a driver module electrically coupled with the control module and the load switch for basing on a control action of the control module upon the load switch to drive the load switch.

3. The converter control system of claim 1, wherein the converter is a flyback converter.

4. A converter control system, electrically coupled with a converter, the converter including an input level circuit, a load switch and an output level circuit, the load switch being electrically coupled with the input level circuit, the output level circuit being electrically coupled with the input level circuit, the converter control system comprising:

an analog-to-digital converter (ADC), electrically coupled with an output terminal of the output level circuit, being to convert a different-time feedback voltage outputted at the output terminal in a different time from an analog-signal form to a digital-signal form, also being to convert a real-time feedback voltage outputted at the output terminal in a real time from an analog-signal form to a digital-signal form;

a filter, electrically coupled with the analog-to-digital converter, being to base on the different-time feedback voltage in the digital-signal form to sample a historical average feedback voltage;

a control module, electrically coupled with the analog-to-digital converter, the filter and the load switch, having a threshold voltage, being to receive the real-time feedback voltage in the digital form outputted from the output terminal, also being to base on the historical average feedback voltage to detect a load status of the converter, further being to base on the real-time feedback voltage and the historical average feedback voltage to derive a voltage difference; and a programmable process module, including:

a multiplicator, electrically coupled with the analog-to-digital converter, having a preset multiplication value, being to perform calculation upon the real-time feedback voltage in the digital-signal form and the preset multiplication value so as to produce a calculated multiplication value;

a first multiplexer, being to base on the load status to selectively receive one of a light-to-heavy load switching-on time and a heavy-to-light load switching-on time; and a second multiplexer, electrically coupled with the multiplicator, the first multiplexer and the control module;

wherein, while the control module detects that the load status is switched from a light-load status to a heavy-load status and the voltage difference reaches the threshold voltage, the control duty cycle is increased for controlling the load switch;

wherein, while the control module detects that the load status is switched from the heavy-load status to the light-load status and the voltage difference reaches the threshold voltage, the control duty cycle is decreased for controlling the load switch;

wherein, the second multiplexer is triggered to receive the light-to-heavy load switching-on time transmitted from the first multiplexer upon when the load status is switched from the light-load status to the heavy-load status and further to transmit the light-to-heavy load switching-on time to the control module; and the second multiplexer is further triggered to receive the heavy-to-light load switching-on time transmitted from the first multiplexer upon when the load status is switched from the heavy-load status to the light-load status and further to transmit the heavy-to-light load switching-on time to the control module;

wherein, in order to keep the load status in original without being switched between the heavy-load status and the light-load status, the second multiplexer maintains to output the calculated multiplication value.

5. The converter control system of claim 4, wherein the programmable process module includes:

a switching-off time lookup unit, electrically coupled with the filter, having a relation-mapping table of the historical average feedback voltage with respect to a switching-off time, being to base on the historical average feedback voltage to obtain and transmit the corresponding switching-off time;

a third multiplexer, being to base on the load status to selectively receive one of a light-to-heavy load switching-off time and a heavy-to-light load switching-off time; and a fourth multiplexer, electrically coupled with the switching-off time lookup unit, the third multiplexer and the control module, being triggered to receive the light-to-heavy load switching-off time transmitted from the third multiplexer upon when the load status is switched from the light-load status to the heavy-load status and further to transmit the light-to-heavy load switching-off time to the control module, being triggered to receive the heavy-to-light load switching-off time transmitted from the third multiplexer upon when the load status is switched from the heavy-load status to the light-load status and further to transmit the heavy-to-light load switching-off time to the control module;

wherein, in order to keep the load status in original without being switched between the heavy-load status and the light-load status, the fourth multiplexer maintains to output the switching-off time.

* * * * *